G. W. BROWN.
Corn-Planters.
No. 151,560. Patented June 2, 1874.
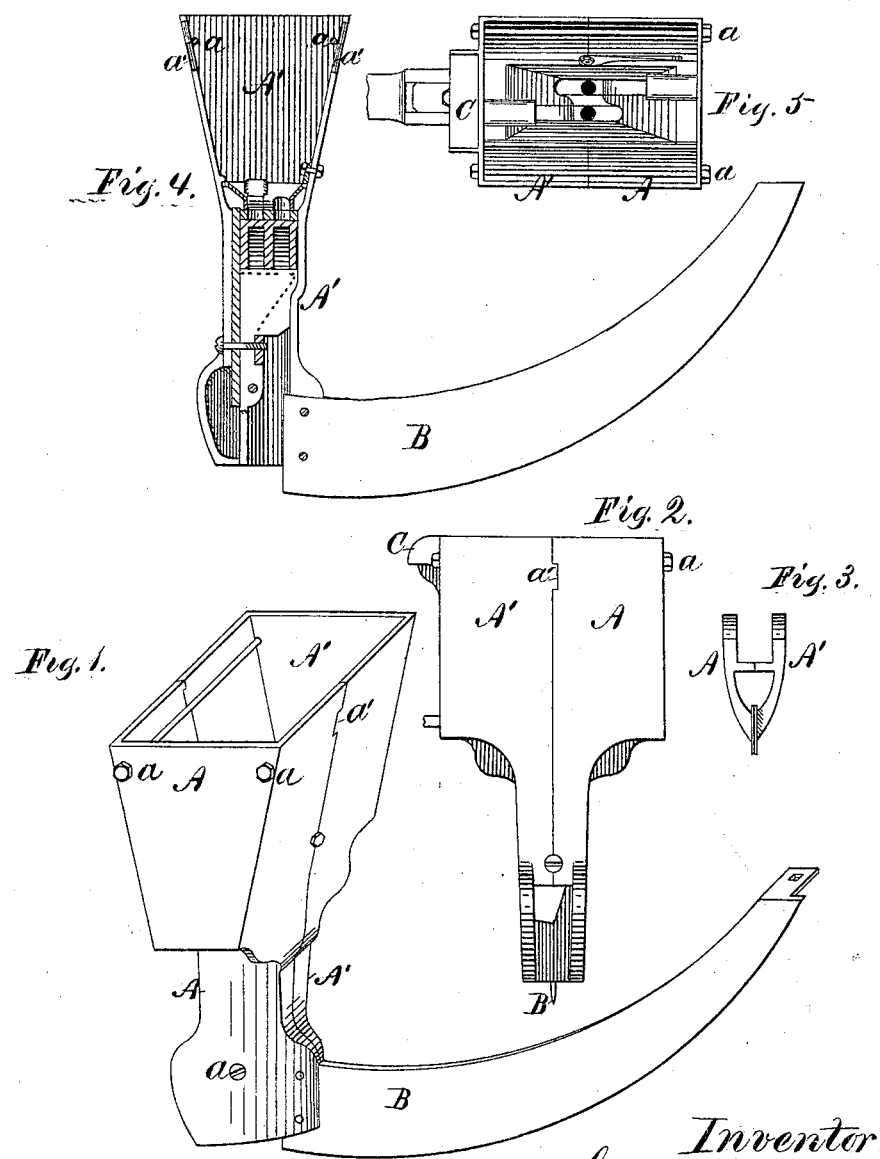

UNITED STATES PATENT OFFICE.

GEORGE W. BROWN, OF GALESBURG, ILLINOIS.

IMPROVEMENT IN CORN-PLANTERS.

Specification forming part of Letters Patent No. 151,560, dated June 2, 1874; application filed February 7, 1874.

CASE D.

*To all whom it may concern:*

Be it known that I, GEORGE W. BROWN, of Galesburg, county of Knox and State of Illinois, have invented certain new and useful Improvements in Corn-Planters, of which the following is a specification:

The present invention relates to improvements in the seed-boxes and seed-tubes for corn-planters, and in the method of securing the runners or furrow-openers thereto; and it consists in constructing the seed-box and seed-tube in two sections, each section composed of one side of the seed-box and one side of the seed-tube cast in one solid piece, and the line of union or connection of the two parts such that they may receive and retain the rear end of the runner between them, and thus cheapen and simplify the construction of the seed box and tube and the attachment of the runner to the tube, all as hereinafter fully described.

To enable those skilled in the art to understand and use my invention, I will now proceed to describe the manner in which the same is or may be carried into effect, by reference to the accompanying drawing, in which—

Figure 1 is a perspective view of my invention. Fig. 2 is an elevation of the rear side of hopper and seed-tube. Fig. 3 is a bottom plan or view seen from the bottom. Fig. 4 is a vertical sectional view on the line of union of the two parts, and Fig. 5 is a top plan or view.

Letters A and A′ represent, respectively, the right and left hand sides of the right-hand seed box and tube of a corn-planter. Each section, A and A′, is cast in one solid piece, including the half of the seed-box and the half of the seed-tube. A side elevation, showing the open side of one of the sections, A′, is shown at Fig. 4, together with the interior devices in section and elevation which constitute the dropping apparatus, the arrangement and functions of which are fully set forth in another application for Letters Patent made by me, and now pending in the United States Patent Office, and need not, therefore, be now described.

The construction of the upper part, or seed-box, may be varied in form, to suit the fancy of the builder or requirements of the case, as may also the lower part, or tube. Each part, however, should be so shaped at its lower end as to form between the two a suitable seat for the rear end of the furrow-opener or runner B, and also formed open at the lower end, in rear, and brought together forward to an edge at their forward sides, where they rest against the runner, as shown at Fig. 3, in order to open the furrow, as desired, and present a favorable form for scouring or keeping clean in use. The sections A A′ may be held together by any suitable bolts, *a a a*, and, to prevent longitudinal displacement, one to the other, may have projections *a′* on one section, to fit in corresponding recesses upon the other. Projections *c* may be cast upon either section, for the purpose of attaching thereto any other part of the planter. Any openings desired may be formed in either section, also, for the passage of any of the operative devices.

Having now described the manner in which my invention may be carried into effect, what I desire to secure by Letters Patent is—

The herein-described combined seed-box and discharging-tube, constructed of metal, in two vertical sections, A A′, substantially as and for the purpose specified.

GEORGE W. BROWN.

Witnesses:
I. S. PERKINS,
J. J. TUNNICLIFF.